United States Patent [19]

Fry

[11] 4,278,270
[45] Jul. 14, 1981

[54] SPRUNG VEHICLES

[75] Inventor: Timothy S. Fry, Dunchurch, England

[73] Assignee: GKN Group Services Limited, Great Britain

[21] Appl. No.: 930,176

[22] Filed: Aug. 2, 1978

[30] Foreign Application Priority Data

Aug. 13, 1977 [GB] United Kingdom ............... 34080/77
Aug. 13, 1977 [GB] United Kingdom ............... 34081/77

[51] Int. Cl.$^3$ .............................................. B60G 3/20
[52] U.S. Cl. .................................... 280/675; 280/667
[58] Field of Search ............... 280/690, 691, 693, 663, 280/666, 667, 677, 679, 675, 96.3

[56] References Cited

U.S. PATENT DOCUMENTS

| | | | |
|---|---|---|---|
| 2,092,612 | 9/1937 | Olley | 280/675 |
| 2,580,559 | 1/1952 | Kolbe | 280/666 X |
| 2,835,521 | 5/1958 | White | 280/674 X |
| 3,044,790 | 7/1962 | Foln et al. | 280/112 R |
| 3,069,185 | 12/1962 | Holmstrom | 280/713 |
| 3,326,544 | 6/1967 | Smith | 267/20 R |
| 3,692,324 | 9/1972 | Corbin | 280/673 |
| 3,709,516 | 1/1973 | Ewert | 280/666 |

FOREIGN PATENT DOCUMENTS

| | | |
|---|---|---|
| 870647 | 3/1953 | Fed. Rep. of Germany . |
| 1116076 | 10/1961 | Fed. Rep. of Germany ........... 280/675 |
| 2505841 | 8/1976 | Fed. Rep. of Germany . |
| 2553960 | 6/1977 | Fed. Rep. of Germany . |
| 2614285 | 10/1977 | Fed. Rep. of Germany ........... 280/675 |
| 794248 | 2/1936 | France . |
| 583840 | 10/1958 | Italy ....................................... 280/675 |
| 339625 | 12/1930 | United Kingdom . |
| 610518 | 10/1948 | United Kingdom . |

Primary Examiner—John J. Love
Assistant Examiner—Norman L. Stack
Attorney, Agent, or Firm—Merriam, Marshall & Bicknell

[57] ABSTRACT

A vehicle having a rigid axle connected to the vehicle chassis by link assemblies each comprising a first link connected at an end of the axle and an upper, second, link pivoted at one end to the chassis, the other ends of the two links being pivoted together. A spring acts on the second link at a position to give a displacement of the spring in roll of between 75% and 125% of its displacement in bump. The upper link may be triangulated in an assembly to provide for pivoting of its connection with the first link about an axis inclined to the vehicle center line.

8 Claims, 6 Drawing Figures

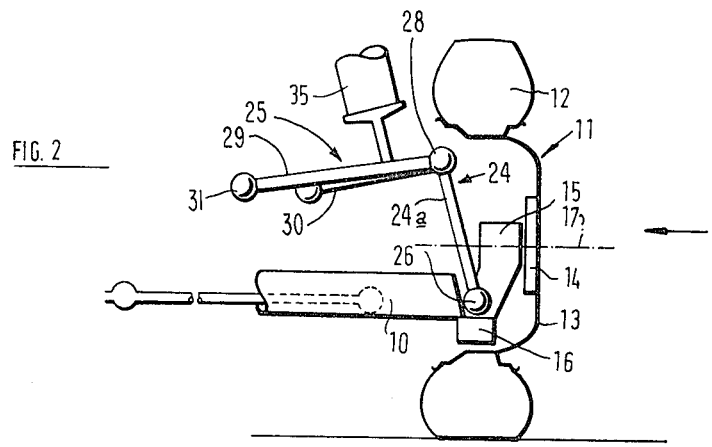
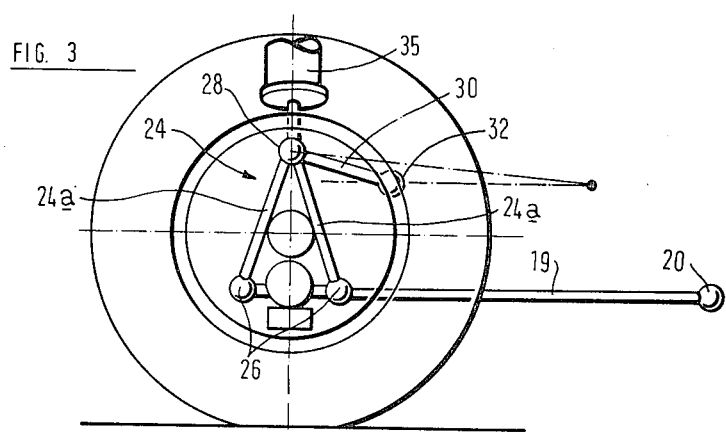
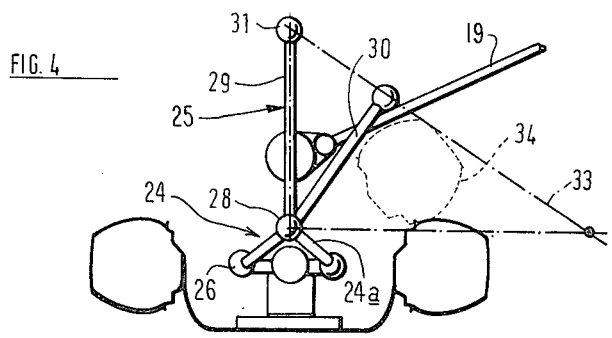

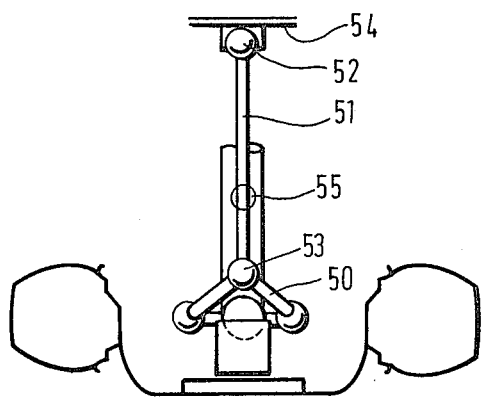
FIG_6
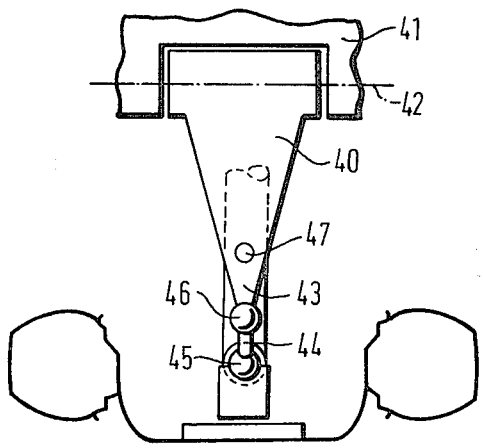
FIG_5.

SPRUNG VEHICLES

BACKGROUND OF THE INVENTION

1. Field of the Invention

This invention relates to vehicles having sprung rigid axles.

2. Description of the Prior Art

In a vehicle having a rigid axle which is conventionally sprung using leaf springs, the characteristics of the spring-restoring force in bump and in roll are usually dissimilar. By "bump" we mean that both ends of the axle are deflected during travel of the vehicle through substantially the same distance perpendicular to a reference plane of the body or chassis of the vehicle and by "roll" we mean that one end of the axle is deflected relative to the other in directions perpendicular to said reference plane. When the vehicle stands on a horizontal surface the reference plane will be horizontal. Thus for a given deflection of the axle relative to the reference plane in bump the spring-restoring force will be greater than that if one end of the axle should be deflected by the same distance i.e. in roll. This is because it is not normally practicable to arrange the springs over the wheel centres. If, for example, leaf springs are arranged halfway between the axle centre and the wheel centres, the spring-restoring force will only be one-quarter in roll of that which it is in bump, assuming the same deflection of the wheel or wheels. This is because in roll the springs deflection will only be one-half of that of the deflected wheel and the restoring moment arm will also only be one-half of what it would be were the springs arranged over the wheel centres.

Moreover, the axial displacement of the spring-restoring force and the wheels induces large bending moments in the axle which has to be of massive construction to withstand these moments.

It is an object of the present invention to provide a vehicle having a sprung axle which may be arranged to give substantially equal spring-restoring forces in bump and roll.

SUMMARY OF THE INVENTION

According to the invention we provide a vehicle comprising a chassis, a rigid axle, a link assembly at each end of the axle, each such assembly comprising a first rigid link pivoted to the axle at or adjacent to an end thereof and a second rigid link pivoted at one end to the chassis, the other ends of the links being pivoted together and stabilised relative to the axle or chassis, and spring means acting on the second link resiliently to support the chassis on the axle, the position of the pivot between each first link and the axle being such that the displacement of the spring means due to a displacement perpendicular to said reference plane of a predetermined point on a wheel in roll is between 75 and 125% of the displacement of the spring means due to an equal displacement of said point in bump.

Because the first link of each assembly is pivoted to the assembly at or adjacent to an end thereof the spring force acts on the axle at that position whether the axle is deflected in bump or in roll and therefore the spring-restoring force can be controlled. Preferably the spring displacement is equal for equal wheel displacements in bump and in roll. In practice this would mean that each first link would be pivoted to the axle substantially on the centre line of the wheel.

Preferably the pivotal connection between each first link and the axle lies below the rotary axis of the wheel at that end of the axle. This connection may be an axis extending fore and aft of the vehicle. Alternatively, a ball joint can be used between the first link and the axle. In either arrangement a ball joint may be used between said other ends of the links.

The spring means can be, for example, a coil spring acting on each second link. Alternatively the spring means can be torsion bars acting on the second links, e.g. by being arranged with their longitudinal axes coincident with the pivot axes of the second links on the chasses.

In a further arrangement each spring means may comprise a pressure transducer acting on the second link and connected by e.g. flexible pipes to a remote spring arrangement which may be variable in effect.

The link assemblies may be provided solely for springing the axle and there may be separate means for controlling the location of the axle. Alternatively, the link assemblies may be part of linkages for controlling the location of the axle.

In this latter case, each link assembly may further comprise a lower rigid link pivoted at its ends to the axle and the chassis respectively about pivot axes parallel to the length of the axle, and the second link may comprise or form part of an upper link assembly pivoted at its one end to the chassis so that its other end pivots about an axis inclined to said centre line, said other end of the upper link being pivotally connected to the other end of said first link.

Although, in this construction, it may be necessary to inset the lower links from the ends of the axle to give clearance to steerable or twin wheels, the upper part of the linkage acts directly at the axle ends and thus inhibits twisting of the axle during braking.

The first and upper links are preferably triangular and pivoted to the axle and the chassis respectively about the bases of their respective triangles and to each other at the apices opposite to said bases. Instead of being a triangulated link, each second upper link can be a single arm pivoted about said inclined axis. The pivot bearings of such an arm, however, would have to be extremely strong.

If the axle carries steerable wheels then it is possible to control the castor angle of the wheels by varying the lengths of the sides of the triangulated first upper link. One may have a series of links made of different sizes or the sides themselves may be adjustable.

If one is providing linkages for a number of vehicles of different sizes, then one can control the position of the pitch centre by using first rigid links of different lengths while using other links of the same length for the different vehicles.

The axle may be driven or non-driven and the wheels thereon may be steerable or not.

BRIEF DESCRIPTION OF THE DRAWINGS

The invention will now be described in detail by way of example with reference to the accompanying diagrammatic drawings in which:

FIG. 2 is a vertical section through the arrangement shown in FIG. 1;

FIG. 3 is an elevation of the arrangement shown in FIG. 1, viewed in the direction of the arrow in FIG. 2; and FIG. 4 is a plan view of the arrangement of FIG. 1.

FIG. 5 is a horizontal section of a further form of linkage embodying the invention.

FIG. 6 is a horizontal section of yet another linkage embodying the invention.

DESCRIPTION OF THE PREFERRED EMBODIMENTS

Figure 1:
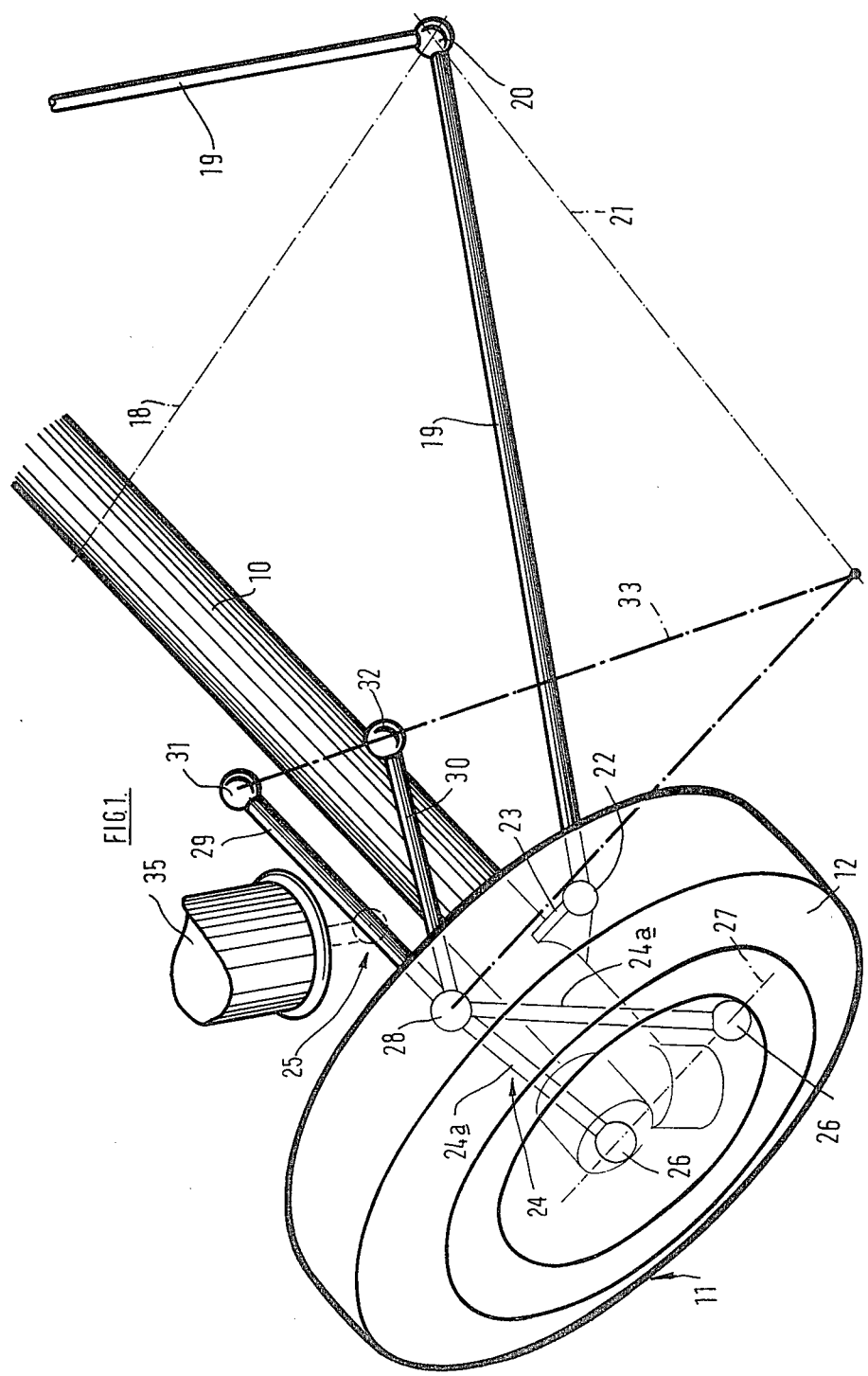
FIG. 1 is a perspective view of one end of an axle showing a linkage embodying the invention.

Referring firstly to FIGS. 1–4 of the drawings, a rigid axle is indicated at 10 and carries at its end a wheel 11 having a tyre 12. The wheel disc 13 is secured to a hub 14 which is rotatably mounted in wheel bearings in a support 15. The support 15 is mounted in swivel bearings located in a cup 16 at the end of the axle 10. It will be noted that there is only one swivel bearing and this is mounted wholly below the rotary axis 17 of the wheel.

The fore and aft centre line of the vehicle is indicated at 18 in FIG. 1 and mounted on each side thereof is a lower link 19. Each link 19 is inclined to the axis 18 and at its forward end is pivoted to the chassis via a ball joint 20 for pivoting movement about an axis 21 parallel to the axle 10. The rear end of each link 19 is pivoted by a ball joint 22 to a bracket 23 secured to the axle but inset from the end thereof. The ball joint 22 pivots the rear end of each link 19 about an axis parallel to the axle 10.

At each end of the axle is a first generally vertically extending link 24 and a second, upper, link assembly 25. Each of these links is triangulated. The first link comprises two limbs 24a which are pivoted by ball joints 26 to the axle at a position below the axis 17 and for pivotal movement about an axis 27 parallel to the centre line 18.

The upper end of the link 24 is pivoted by a ball joint 28 to the outer end of the link 25. This link 25 comprises two limbs 29 and 30 pivoted at their inner ends by ball joints 31 and 32 to the chassis, not shown, of the vehicle. It will be noted that the limbs 29 and 30 are of unequal length and as a result, the link 25 is pivoted about an axis 33 which is inclined to the fore and aft of the vehicle.

FIG. 4 shows, at 34, the position of the tyre when the wheel is steered and it will be seen that the link 19 has to be offset to clear the wheel but the links 24 and 25 are so arranged as to give clearance to the wheel during its steering movement.

Springing means 35 acts on the limb 29 of link 25. The springing means may be a coiled compression spring or may, as shown, be a pressure transducer which is connected by flexible pipes, not shown, to a spring means whose rate may be varied.

It will be noted that the joints 26 are located in the centre plane of the wheel 11. It follows that for a given vertical displacement of a predetermined point on the wheel there will be a given displacement at the spring means 35. This will be so whether the wheel is displaced in roll or bump. This displacement of the wheel is relative to a reference plane of the vehicle chassis or body, which reference plane will, when the vehicle is standing on a horizontal surface, be horizontal. The wheel displacement perpendicular to this plane may be due either to the wheel or the chassis moving in space and relative to each other.

It is preferred that the link 24 is pivoted to the axle 10 on the centre plane of the wheel, but it is possible to displace the pivotal axis 27 relative to the centre plane of the wheel. If one moves the axis 27 outboardly away from the axle centre, then one will increase the roll stiffness, and if one moves the axis 27 inboardly towards the axle centre from the position shown there will be a decrease in roll stiffness. The arrangement is such that for a given displacement of a predetermined point on the wheel (e.g. the lower most point of the wheel and tyre assembly) relative to the reference plane in roll the spring displacement must be between 75 and 125% of that caused by the same displacement of the point on the wheel in bump.

The linkages provided by the invention enable the pitch centre of the vehicle to be determined by variations in the length and mutual relations of the links while still giving clearance to the steerable wheel as shown in FIG. 4 and eliminating torsional forces in the end portions of the axle since the link 24 is pivoted to the axle adjacent the ends thereof.

As above described, the linkage which provides the characteristic of equal spring displacement, whether the wheel is displaced in roll or bump, forms part of a linkage which also controls the location of the axle. However, the linkage as shown in FIG. 5 or FIG. 6 may be used for providing the required spring displacement characteristics while there is provided separate means for controlling the location of the axle. In FIG. 5, a triangulated link 40 is pivoted to the chassis 41 of the vehicle about a fore and aft axis 42. This pivotal arrangement stabilizes the end 43 of the link 40 relative to the chassis. A single link 44 is connected by ball joints 45, 46 to the axle and link 40 respectively, and springing means acts on link 40 at a position 47. The position at which link 44 is pivoted to the axle corresponds to the position at which link 24 is pivoted to the axle in the arrangement of FIGS. 1–4.

In FIG. 6, a first link 50 of the same general form as the link 24 of FIGS. 1–4 is pivoted to the axle, and a link 51 is pivoted by ball joints 52, 53 to the chassis 54 of the vehicle and link 50 respectively. Spring means acts on link 51 at 55. This arrangement and the arrangement of FIG. 5 provide for spring displacement characteristics as described in relation to FIGS. 1–4, but require additional means for controlling axle location.

I claim:

1. A vehicle comprising a chassis, a rigid axle, and a link assembly at each end of the axle, each such assembly comprising a first rigid link, means providing a pivotal connection between one end of said first rigid link and the axle, a second rigid link, means providing a pivotal connection between one end of the second rigid link and the chassis and means providing a pivotal connection between the other end of the second rigid link and the other end of the first rigid link and for stabilising said pivotal connection relative to one of the axle and the chassis, and spring means connected between the second link and the chassis resiliently to support the chassis and axle relative to one another, the pivotal connection between said one end of the first rigid link and the axle lying substantially on the centre line of the road wheel to be supported at the respective axle end so that the displacement of the spring means due to a displacement, perpendicular to a reference surface on which the vehicle stands, of the wheel in roll is substantially equal to the displacement of the spring means due to an equal displacement of the wheel in bump.

2. A vehicle according to claim 1 wherein the pivotal connection between each first link and the axle lies below the rotary axis of said wheel at that end of the axle.

3. A vehicle according to claim 2 wherein each said pivotal connection comprises a pivotal axis extending fore and aft of the vehicle.

4. A vehicle according to claim 1 wherein each link assembly further comprises a lower rigid link pivoted at its ends to the axle and the chassis of the vehicle respectively about pivot axes parallel to the length of axle, and wherein the second link comprises or forms part of an upper link assembly pivoted at one end to the chassis so that its other end pivots about an axis inclined to the centre line of the vehicle, said other end of the upper link being pivotally connected to the other end of said first link.

5. A vehicle according to claim 4 wherein the first and upper links are triangular and are pivoted to the axle and chassis respectively about the bases of their respective triangles and to each other at the apices opposite said bases.

6. A vehicle according to claim 1 wherein each link assembly further comprises a lower rigid link and means pivotally connecting its ends respectively to the axle and chassis of the vehicle, about pivotal axes parallel to the length of the axle.

7. A vehicle according to claim 1 wherein the second link forms part of an upper link assembly including a further rigid link and means providing pivotal connection between the ends thereof and the chassis of the vehicle and the second link adjacent its connection with the first link respectively, the connections between the ends of the upper links and the chassis defining a pivotal axis inclined to the centre line of the vehicle.

8. A vehicle according to claim 1 wherein the first link is triangular and is pivoted to the axle about the base of its triangle and to the second link about the apex opposite said base.

* * * * *